US012356514B1

(12) United States Patent
Huang

(10) Patent No.: US 12,356,514 B1
(45) Date of Patent: Jul. 8, 2025

(54) ELECTRIC BLANKET

(71) Applicant: Long Huang, Yongcheng (CN)

(72) Inventor: Long Huang, Yongcheng (CN)

( * ) Notice: Subject to any disclaimer, the term of this patent is extended or adjusted under 35 U.S.C. 154(b) by 0 days.

(21) Appl. No.: 18/910,696

(22) Filed: Oct. 9, 2024

(51) Int. Cl.
*H05B 3/34* (2006.01)

(52) U.S. Cl.
CPC .................................... *H05B 3/342* (2013.01)

(58) Field of Classification Search
CPC ......... H05B 3/342; H05B 3/345; H05B 3/347
USPC .......................................................... 219/212
See application file for complete search history.

(56) References Cited

U.S. PATENT DOCUMENTS 8,367,987 B2 * 2/2013 Ishii ......................... H01C 1/01 219/545
2015/0021313 A1 * 1/2015 Chang ...................... H05B 3/34 219/528

* cited by examiner

*Primary Examiner* — Chris Q Liu
*Assistant Examiner* — James F Sims, III
(74) *Attorney, Agent, or Firm* — Nitin Kaushik

(57) ABSTRACT

An electric blanket is provided, which includes a PTC electric heating wire, a switch module, a control module, and a protection module. The switch module is connected to the PTC electric heating wire and correspondingly causes the PTC electric heating wire to be powered on or off when it is conducted on or off; the control module is used to control conduction or disconnection of the switch module and is configured to obtain voltage signal at two ends of the PTC electric heating wire through the switch module, convert the voltage signal to obtain a resistance value of the PTC electric heating wire so as to obtain a current temperature value of the PTC electric heating wire, control the current temperature value of the PTC electric heating wire within a preset range, and detect whether the PTC electric heating wire is burned through via the protection module.

10 Claims, 7 Drawing Sheets

ELECTRIC BLANKET

TECHNICAL FIELD

The present disclosure relates to the field of electric blanket technologies, and in particular, to an electric blanket.

BACKGROUND

In the cold winter, electric blankets have become an indispensable heating companion for many families due to the warm and comfortable characteristics. However, existing electric blankets usually have only two settings, on and off, and can only be manually adjusted for temperature. For example, when the electric blanket is turned on, if the temperature is too high, the electric blanket needs to be manually turned off to stop heating. When the temperature is too low, the electric blanket needs to be manually turned on for heating, which is inconvenient to use and cannot automatically adjust the temperature.

SUMMARY

Embodiments of the present disclosure provide an electric blanket that can automatically control the temperature of the electric blanket within a preset range without a need for manually adjusting temperature, rendering it convenient to use.

In order to achieve the above objectives, some embodiments of the present disclosure provide an electric blanket, including:

- a PTC electric heating wire, which is connected to an AC power source and generates heat when it is powered on;
- a switch module, which is connected to the PTC electric heating wire and correspondingly causes the PTC electric heating wire to be powered on or off when it is conducted on or off;
- a control module, which is connected to the switch module and capable of controlling conduction or disconnection of the switch module;
- a protection module, which is connected to the control module;
- where the control module is configured to;
- obtain voltage signal at two ends of the PTC electric heating wire through the switch module, convert the voltage signal so as to obtain a resistance value of the PTC electric heating wire, obtain a current temperature value of the PTC electric heating wire based on the resistance value of the PTC electric heating wire,
- control the current temperature value of the PTC electric heating wire within a preset range through the switch module, and
- detect whether the PTC electric heating wire is burnt through via the protection module, and if so, the PTC electric heating wire is controlled to be powered off through the switch module.

In some embodiments of the present disclosure, the electric blanket further includes a power conversion module, the power conversion module is connected to the AC power source for converting AC power into a working voltage required by the control module, where the power conversion module includes a voltage dependent resistor VR, a first capacitor CX1, a first electrolytic capacitor C1, a second electrolytic capacitor C2, a first resistor R1, a fourteenth resistor R14, a fifteenth resistor R15, a thirteenth resistor R13, a second diode D2, a third diode D3, and a chip IC1;

one end of the voltage dependent resistor VR, one end of the first capacitor CX1, one end of the fourteenth resistor R14, and one end of the first resistor R1 are all connected to a live wire of the AC power supply: the other end of the fourteenth resistor R14, one end of the fifteenth resistor R15, the other end of the voltage dependent resistor VR, the other end of the first capacitor CX1, and the other end of the fifteenth resistor R15 are all grounded; the other end of the first resistor R1 is connected to a positive pole of the third diode D3, a negative pole of the third diode D3 is connected to a positive pole of the second diode D2; a negative pole of the second diode D2 is connected to four Drain pins of the chip IC1; a VOUT pin of the chip IC1 is connected to a positive pole of the second electrolytic capacitor C2; the control module is connected to the VOUT pin of the chip IC1, a SEL pin of the chip IC1 is grounded by the thirteenth resistor R13, a VDD pin of the chip IC1 is connected to a positive pole of the first electrolytic capacitor C1, a negative pole of the first electrolytic capacitor C1 and a negative pole of the second electrolytic capacitor C2 are both grounded, a GND pin of the chip IC1 is grounded.

In some embodiments of the present disclosure, the control module includes a chip U1, which is implemented by a microcontroller, a VDD pin of the chip U1 is connected to the VOUT pin of the chip IC1.

In some embodiments of the present disclosure, the switch module includes a first bidirectional thyristor T1, a second bidirectional thyristor T2, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12, a twenty-first resistor R21, a fourth capacitor C4, a fifth capacitor C5, a sixth capacitor C6, a seventh capacitor C7, a tenth capacitor C10, a seventh diode D7, an eighth diode D8, and a voltage regulator D9;

- a first pin of the first bidirectional thyristor T1 is connected to a second pin of the second bidirectional thyristor T2, a second pin of the first bidirectional thyristor T1 is connected to one end of the PTC electric heating wire, the other end of the PTC electric heating wire is connected to the live wire of the AC power supply, a third pin of the first bidirectional thyristor T1 is connected to a negative pole of the voltage regulator D9 sequentially through the seventh resistor R7, the twenty-first resistor R21, and the sixth capacitor C6; a positive pole of the voltage regulator D9 is grounded, a first pin of the second bidirectional thyristor T2 is grounded through the second resistor R2, a third pin of the second bidirectional thyristor T2 is connected to a HEAT pin of the chip U1 sequentially through the fifth resistor R5 and the fifth capacitor C5; one end of the third resistor R3 and one end of the fourth resistor R4 are both connected to the first pin of the second bidirectional thyristor T2; the other end of the third resistor R3, one end of the fourth capacitor C4, and a negative pole of the eighth diode D8 are all connected to an AD_PTC pin of the chip U1; the other end of the fourth capacitor C4 and a positive pole of the eighth diode D8 are both grounded; the sixth resistor R6 is connected between the negative pole of the voltage regulator D9 and the HEAT pin of the chip U1; one end of the eighth resistor R8 and one end of the seventh capacitor C7 are both connected to an AD_SCR pin of the chip U1, and the other end of the seventh capacitor C7 is grounded; the other end of the eighth resistor R8 is connected to one end of the ninth resistor R9, one end of the tenth resistor R10, and the first pin of the first bidirectional thyristor T1; the other end of the ninth resistor R9 is connected to the third pin of the first bidirectional thyristor T1; the other end of the tenth resistor R10 is connected to one end of the eleventh resistor R11, one end of the twelfth resistor R12, and one end of the tenth capacitor C10, the other end of the eleventh resistor R11 is connected to a negative pole of the seventh diode D7; the other end of the twelfth resistor R12 and the other end of the tenth capacitor C10 are both grounded; a positive pole of the seventh diode D7 is connected to the second pin of the first bidirectional thyristor T1.

In some embodiments of the present disclosure, the protection module includes a protective winding and a detection circuit, the PTC electric heating wire includes a heating wire and a polyvinyl chloride layer that wraps the heating wire and having NTC characteristics, where the protective winding is wound on an outer surface of the polyvinyl chloride layer, so that there is a coupling effect between the protective winding and the heating wire, and the detection circuit includes a twenty-second resistor R22, a twenty-third resistor R23, a twenty-fourth resistor R24, an eighth capacitor C8, a fifth diode D5, and a sixth diode D6; a positive pole of the fifth diode D5 and a negative pole of the sixth diode D6 are both connected to one end of the protective winding; a negative pole of the fifth diode D5 is connected to one end of the twenty-second resistor R22; a positive pole of the sixth diode D6 is connected to one end of the twenty-fourth resistor R24; the other end of the twenty-second resistor R22, one end of the twenty-third resistor R23, and one end of the eighth capacitor C8 are all connected to a NTC pin of the chip U1; the other end of the twenty-third resistor R23, the other end of the eighth capacitor C8, and the other end of the twenty-fourth resistor R24 are all grounded: the other end of the protective winding is connected to the second pin of the first bidirectional thyristor T1; the chip U1 obtains a voltage generated by the coupling effect between the protective winding and the heating wire through the NTC pin and detects whether the PTC electric heating wire is burnt through via the voltage generated by the coupling effect.

In some embodiments of the present disclosure, the electric blanket further includes a zero-cross detection and voltage-reference module, where the zero-cross detection and the voltage reference module includes a fourth diode D4, a sixteenth resistor R16, a seventeenth resistor R17, an eighteenth R18, and a ninth capacitor C'9;

a positive pole of the fourth diode D4 is connected to the live wire of the AC power supply; a negative pole of the fourth diode D4 is connected to one end of the seventeenth resistor R17 and one end of the eighteenth R18; the other end of the eighteenth R18 is connected to a ZERO pin of the chip U1; the other end of the seventeenth resistor R17, one end of the sixteenth resistor R16, and one end of the ninth capacitor C9 are all connected to an AD-AC pin of the chip U1; the other end of the sixteenth resistor R16 and the other end of the ninth capacitor C9 are both grounded.

In some embodiments of the present disclosure, the electric blanket further includes a button module, where the button module includes a power button, a heating button, and a timing button; when the timing button is pressed, the control module controls the switch module to be disconnected after a timing time has elapsed.

In some embodiments of the present disclosure, one ends of the power button, the heating button, and the timing button are grounded; the other ends of the power button, the heating button, and the timing button are respectively connected to a KEY1 pin, a KEY2 pin, and a KEY3 pin of the chip U1.

In some embodiments of the present disclosure, the electric blanket further includes a program burning interface, where a first pin of the program burning interface is connected to the VDD pin of the chip U1;

a second pin of the program burning interface is grounded; a third pin, a fourth pin, and a fifth pin of the program burning interface are respectively connected to the KEY3 pin, the KEY1 pin, and the KEY2 pin of the chip U1.

In some embodiments of the present disclosure, the electric blanket further includes a display module, where the display module includes a nineteenth resistor R19, a twentieth resistor R20, and 14 light emitting diodes; where the 14 light emitting diodes are respectively a first light emitting diodes L1, a second light emitting diode L2, a third light emitting diode L3, a fourth light emitting diode L4, a fifth light emitting diode L5, a sixth light emitting diode L6, a seventh light emitting diode L7, an eighth light emitting diode L8, a ninth light emitting diode L9, a tenth light emitting diode L10, an eleventh light emitting diode L11, a twelfth light emitting diode L12, a thirteenth light emitting diode L13 and a fourteenth light emitting diode L14;

one end of the nineteenth resistor R19 is connected to a COME1 pin of the chip U1; the other end of the nineteenth resistor R19 is connected to negative poles of the light emitting diodes L1 to L7; positive poles of the light emitting diodes L1 to L7 are respectively connected to a SEG_A pin, a SEG_B pin, a SEG_C pin, a SEG_D pin, a SEG_E pin, a SEG_F pin, and a SEG_G pin of the chip U1; one end of the twentieth resistor R20 is connected to a COME2 pin of the chip U1; the other end of the twentieth resistor R20 is connected to negative poles of the light emitting diodes L8 to L14; positive poles of the light emitting diodes L8 to L14 are respectively connected to the SEG_A pin, the SEG_B pin, the SEG_C pin, the SEG_D pin, the SEG_E pin, the SEG_F pin, and the SEG_G pin of the chip U1.

Beneficial effects: the electric blanket of the present disclosure includes a PTC electric heating wire connected to an AC power source and generating heat when powered on; a switch module connected to the PTC electric heating wire and correspondingly causing the PTC electric heating wire to be powered on or off when it is conducted on or off; a control module connected to the switch module, used to control conduction or disconnection of the switch module; a protection module, connected to the control module; and the control module is configured to obtain voltage signal at two ends of the PTC electric heating wire through the switch module, convert the voltage signal so as to obtain a resistance value of the PTC electric heating wire, obtain a current temperature value of the PTC electric heating wire based on the resistance value of the PTC electric heating wire; control the current temperature value of the PTC electric heating wire within a preset range through the switch module; and detect whether the PTC electric heating wire has been burned through via the protection module, and if so, the PTC electric heating wire can be controlled to be powered off through the switch module. This can control the temperature of the PTC electric heating wire within the preset range, avoiding burns caused by high temperature or poor heating effect caused by low temperature. There is no need to manually adjust the temperature, which is convenient to use.

Furthermore, by using the protection module for burn-through detection, it can effectively avoid a problem of electric shock caused by an outer layer of the heating wire melting due to burning or heat accumulation of the heating wire of the electric blanket, and resulting in an exposure of an internal copper wire.

BRIEF DESCRIPTION OF DRAWINGS

Combining with the accompanying drawings, a detailed description of specific embodiments of the present disclosure will render the technical solution and its beneficial effects obvious.

DESCRIPTION OF EMBODIMENTS

Figure 1:
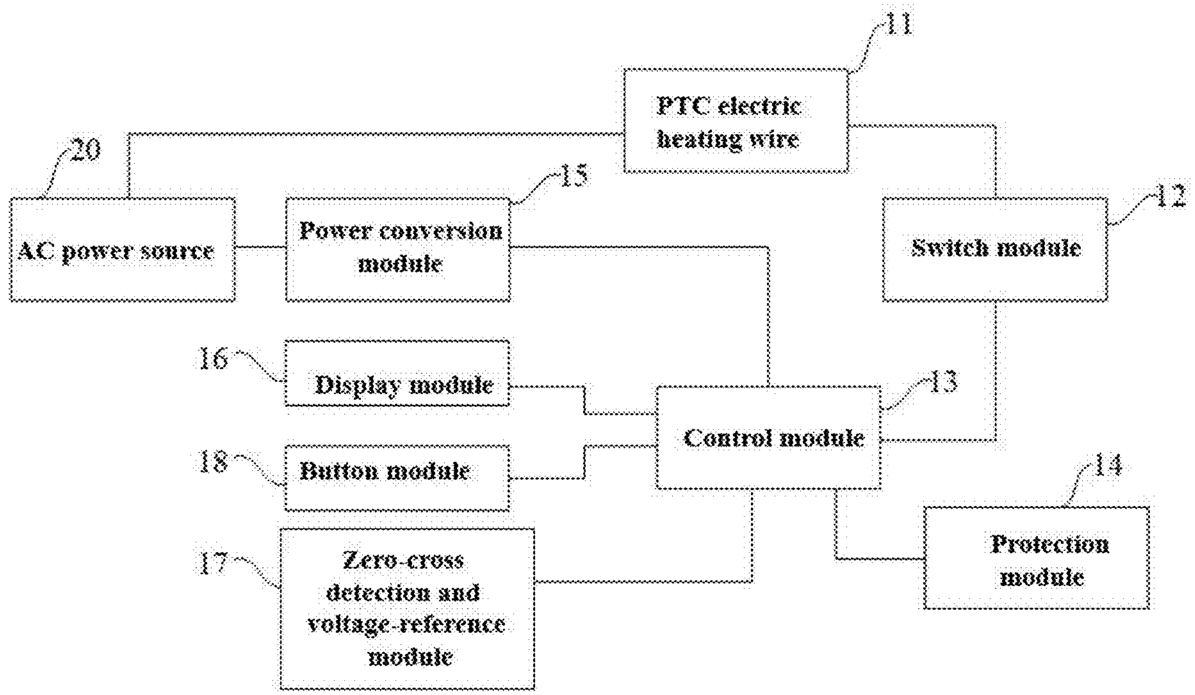
FIG. 1 is a schematic structural diagram of an electric blanket according to an embodiment of the present disclosure.

Referring to the drawings, same reference number represents the same components, and the principle of the present disclosure is illustrated by implementing it in an appropriate computing environment. The following description is based on the specific embodiments of the present disclosure illustrated, and should not be construed as limiting other specific embodiments of the present disclosure that are not described in detail herein.

In a description of the present disclosure, it should be understood that terms "center". "longitudinal", "transverse", "length", "width", "thickness", "up", "down", "front", "back". "left", "right", "vertical", "horizontal", "top", "bottom". "inside", "outside" and other directional or positional relationships indicated are based on the directional or positional relationships shown in the accompanying drawings, only for a convenience of describing the present disclosure and simplifying the description, and do not indicate or imply that the device or component referred to must have a specific orientation, be constructed and operated in a specific orientation, and therefore cannot be understood as a limitation of the present disclosure. In addition, terms "first" and "second" are only used for descriptive purposes and cannot be understood as indicating or implying relative importance or implying the number of technical features indicated. Thus, the features limited to "first" and "second" may explicitly or implicitly include one or more features. In the description of the present disclosure, the meaning of "a plurality of" refers to two or more, unless otherwise specifically limited.

An electric blanket of an embodiment of the present disclosure uses a PTC (Positive Temperature Coefficient Thermistor) electric heating wire as a heating device to achieve heating function, where the PTC electric heating wire is a positive temperature coefficient thermistor heating wire, and its resistance value is increased with an increase of temperature.

Referring to FIG. 1, the electric blanket in an embodiment of the present disclosure includes a PTC electric heating wire 11, a switch module 12, a control module 13, and a protection module 14.

Where, the PTC electric heating wire 11 is connected to an AC power supply 20 and generates heat when powered on. The switch module 12 is connected to the PTC electric heating wire 11, and when it is conducted on or off, it correspondingly causes the PTC electric heating wire 11 to be powered on or off. The control module 13 is connected to the switch module 12 for controlling conduction or disconnection of the switch module 12; the protection module 14 is connected to the control module 13, and the control module 13 is configured to:

obtain voltage signal at two ends of the PTC electric heating wire 11 through the switch module 12, convert the voltage signal so as to obtain a resistance value of the PTC electric heating wire 11, obtain a current temperature value of the PTC electric heating wire 11 based on the resistance value of the PTC electric heating wire 11; control the current temperature value of the PTC electric heating wire 11 within a preset range through the switch module 12; and detect whether the PTC electric heating wire 11 is burned through via the protection module 14. If so, the PTC electric heating wire 11 is controlled to be powered off through the switch module 12.

Therefore, through the above way, the temperature of the PTC electric heating wire 11 can be controlled within the preset range, avoiding burns caused by high temperature or poor heating effect caused by low temperature, and there is no need for manual temperature adjustment, it is convenient to use. Furthermore, through the protection module 14 for burn-through detection, when a burn through occurs, the PTC electric heating wire 11 is controlled to be powered off, which can effectively prevent the PTC electric heating wire 11 from burning out or accumulating heat due to overheating or other abnormal reasons of the electric blanket, causing the PVC (polyvinyl chloride) wire skin of the PTC electric heating wire 11 to melt, thereby exposing an internal heating wire and causing electric shock to the human body.

In an implementation mode, the electric blanket further includes a power conversion circuit 15, which is connected to the AC power source 20 for converting AC power into an operating voltage required by the control module 13.

Figure 2:
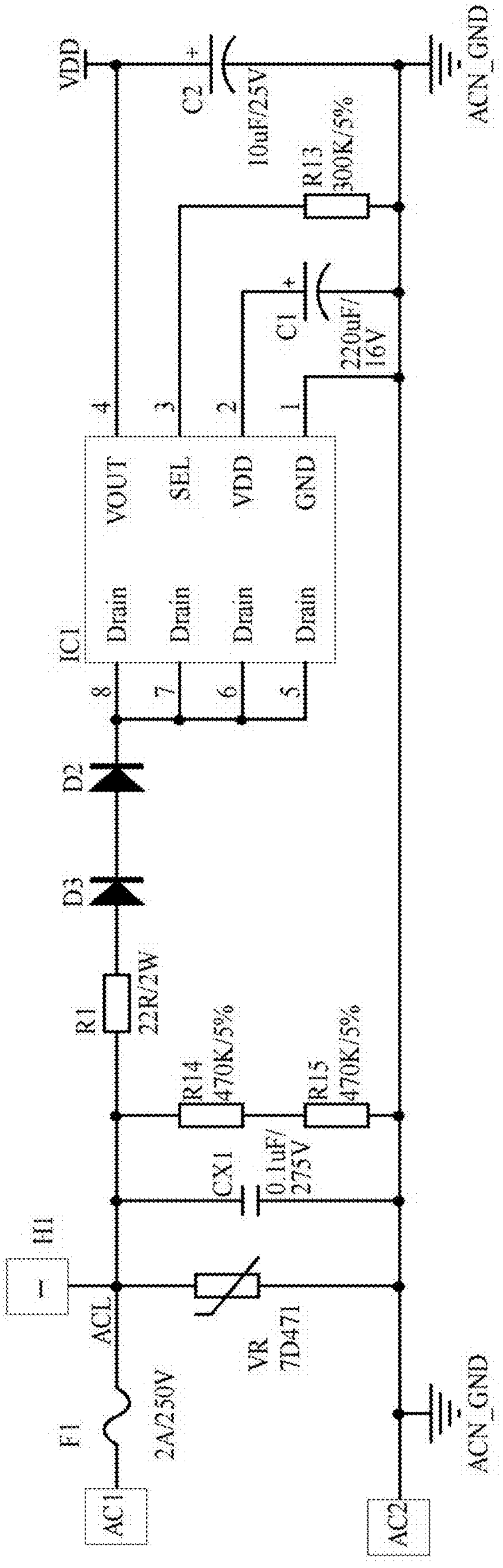
FIG. 2 is a circuit diagram of a power conversion module according to an embodiment of the present disclosure.

The AC power supply 20 can be, for example, mains power, and the power conversion module 15 is configured to convert the mains power into a stable DC power supply. As shown in FIG. 2, the power conversion module 15 includes a voltage dependent resistor VR, a first capacitor CX1, a first electrolytic capacitor C1, a second electrolytic capacitor C2, a first resistor R1, a fourteenth resistor R14, a fifteenth resistor R15, a thirteenth resistor R13, a second diode D2, a third diode D3, and a chip IC1. One end of the voltage dependent resistor VR, one end of the first capacitor CX1, one end of the fourteenth resistor R14, and one end of the first resistor R1 are all connected to a live wire AC1 of the AC power supply 20; a neutral wire AC2 of the AC power supply is grounded. The other end of the fourteenth resistor R14 is connected to one end of the fifteenth resistor R15; the other end of the voltage dependent resistor VR, the other end of the first capacitor CX1, and the other end of the fifteenth resistor R15 are grounded; the other end of the first resistor R1 is connected to a positive pole of the third diode D3; a negative pole of the third diode D3 is connected to a positive pole of the second diode D2; a negative pole of the second diode D2 is connected to four Drain pins of the chip IC1. A VOUT pin of the chip IC1 is connected to a positive pole of the second electrolytic capacitor C2; the control module 12 is connected to the VOUT pin of the chip IC1. A SEL pin of the chip IC1 is grounded through the thirteenth resistor R13. A VDD pin of the chip IC1 is connected to a positive pole of first electrolytic capacitor C1. A negative pole of first electrolytic capacitor C1 and a negative pole of the second electrolytic capacitor C2 are both grounded. A GND pin of the chip IC1 is grounded.

Where, the power conversion module 15 can be used to convert the mains power into a 5V DC voltage, that is, a voltage output from the VOUT pin of the chip IC1 is 5V, thereby providing the working voltage for the control module 12. The chip IC1 may have a model of KP3310, the KP3310 chip is an offline linear regulator designed without inductance. It integrates protection functions with self-recovery function, including VDD undervoltage protection, VDD overvoltage protection, output overload protection, output undervoltage protection, lightning surge protection, and built-in over temperature protection.

Figure 3:
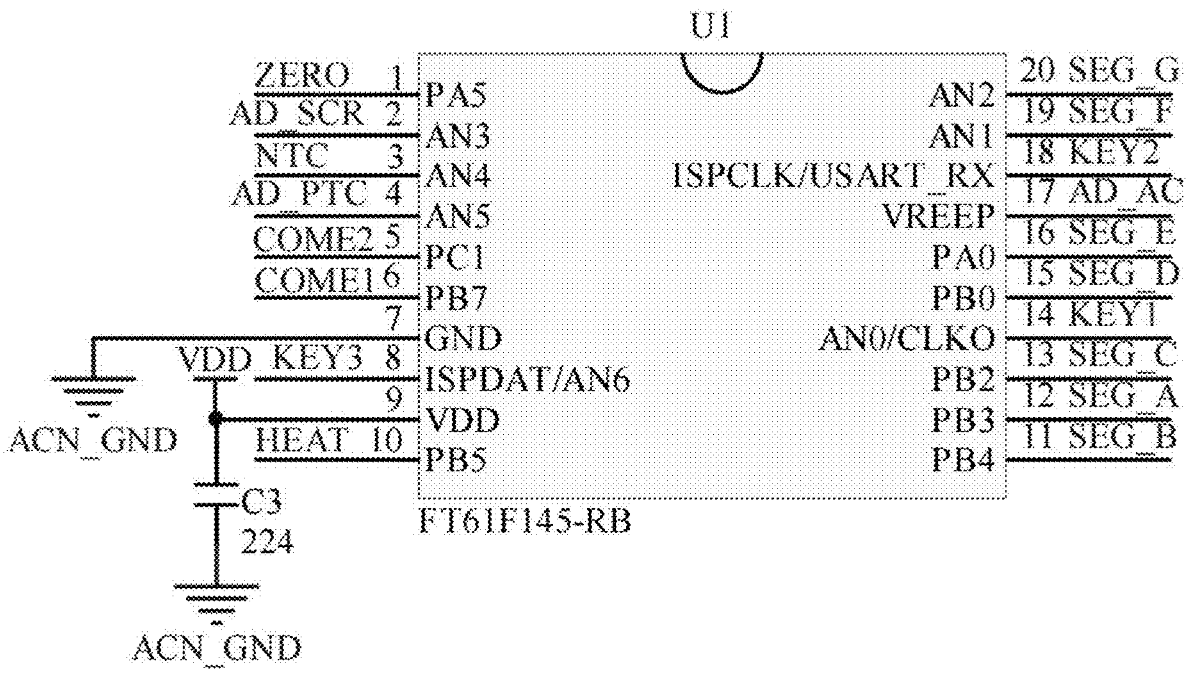
FIG. 3 is a circuit diagram of a control module according to an embodiment of the present disclosure.

Where, as shown in FIG. 3, the control module 13 includes a chip U1, which is implemented by a microcontroller. The microcontroller may have a model of FT61F145-RB, which uses RISC (Reduced Instruction Set Computer) reduced instruction set, 16-layer hardware stack, integrates 7-channel 12 resolution ADC (Analog to Digital Converter) module. 8-bit EEPROM storage, and a 20-pin TSSOP (Thin Shrink Small Outline Package) package. Where, the control module 12 further includes a third capacitor C3, and a VDD pin of the chip U1 is grounded through the third capacitor C3. The VDD pin of the chip U1 is connected to the VOUT pin of the chip IC1.

Figure 4:
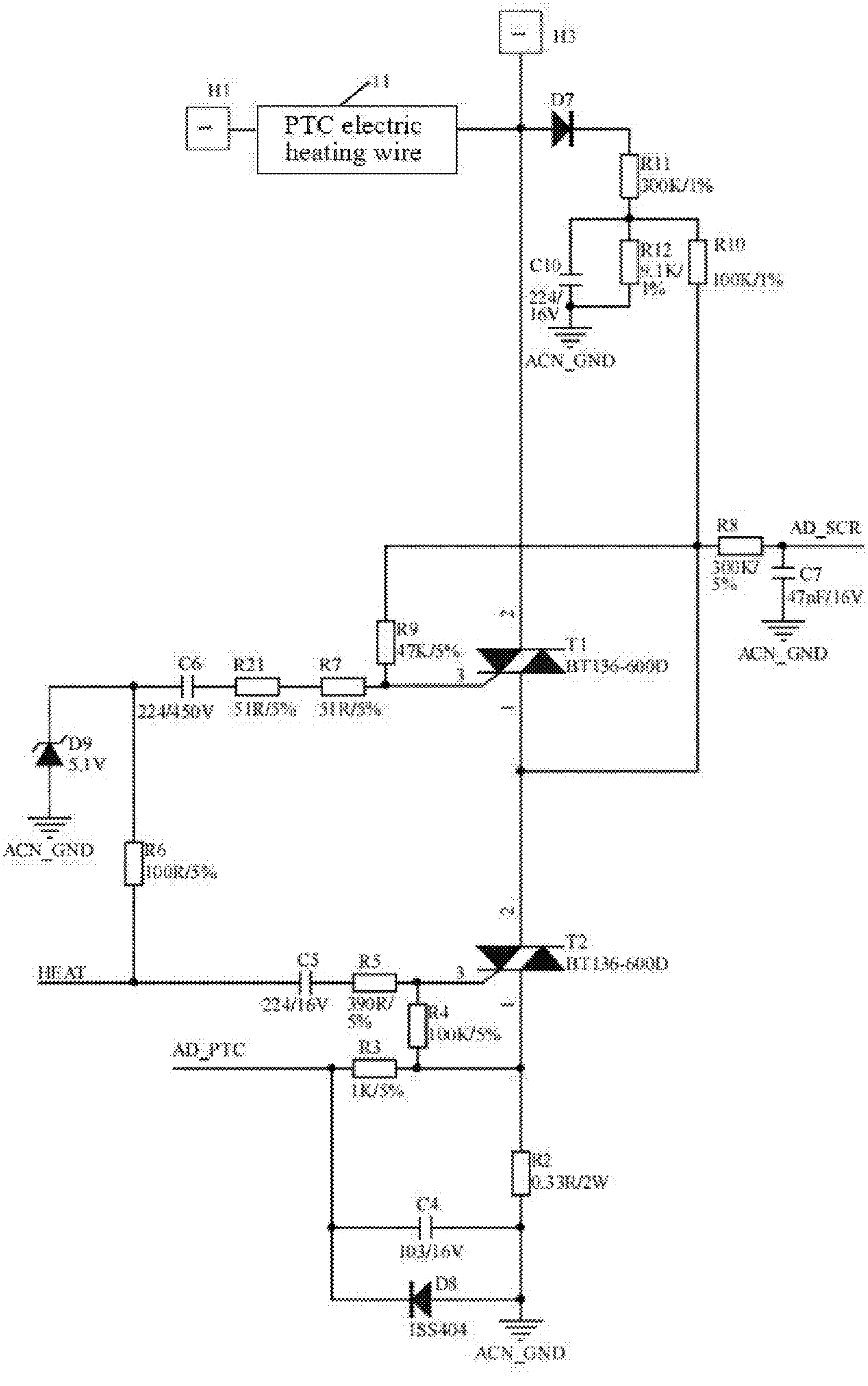
FIG. 4 is a circuit diagram of a switch module according to an embodiment of the present disclosure.

As shown in FIG. 4, the switch module 12 includes a first bidirectional thyristor T1, a second bidirectional thyristor T2, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12, a twenty-first resistor R21, a fourth capacitor C4, a fifth capacitor C5, a sixth capacitor C'6, a seventh capacitor C7, a tenth capacitor C10, a seventh diode D7, an eighth diode D8, and a voltage regulator D9.

A first pin of the first bidirectional thyristor T1 is connected to a second pin of the second bidirectional thyristor T2: a second pin of the first bidirectional thyristor T1 is connected to one end of the PTC electric heating wire 11. The other end of the PTC electric heating wire 11 is connected to the live wire AC1 of the AC power supply 20. A third pin of the first bidirectional thyristor T1 is connected to a negative pole of the voltage regulator D9 sequentially through the seventh resistor R7, the twenty-first resistor R21, the sixth capacitor C6: a positive pole of the voltage regulator D9 is grounded. A first pin of the second bidirectional thyristor T2 is grounded through the second resistor R2. A third pin of the second bidirectional thyristor T2 is connected to a HEAT pin of the chip U1 sequentially through the fifth resistor R5 and the fifth capacitor C5. One end of the third resistor R3 and one end of the fourth resistor R4 are both connected to the first pin of the second bidirectional thyristor T2. The other end of the third resistor R3, one end of the fourth capacitor C4 and a negative pole of the eighth diode D8 are all connected to an AD-PTC pin of the chip U1. The other end of the fourth capacitor C4 and a positive pole of the eighth diode D8 are both grounded. The sixth resistor R6 is connected between the negative pole of the voltage regulator D9 and the HEAT pin of the chip U1. One end of the eighth resistor R8 and one end of the seventh capacitor C7 are both connected to an AD_SCR pin of the chip U1; the other end of the seventh capacitor C7 is grounded. The other end of the eighth resistor R8 is connected to one end of the ninth resistor R9, one end of the tenth resistor R10, and the first pin of the first bidirectional thyristor T1. The other end of the ninth resistor R9 is connected to the third pin of the first bidirectional thyristor T1. The other end of the tenth resistor R10 is connected to one end of the eleventh resistor R11, one end of the twelfth resistor R12, and one end of the tenth capacitor C10. The other end of the eleventh resistor R11 is connected to a negative pole of the seventh diode D7. The other end of the twelfth resistor R12 and the other end of the tenth capacitor C10 are both grounded. A positive pole of the seventh diode D7 is connected to the second pin of the first bidirectional thyristor T1.

Figure 9:
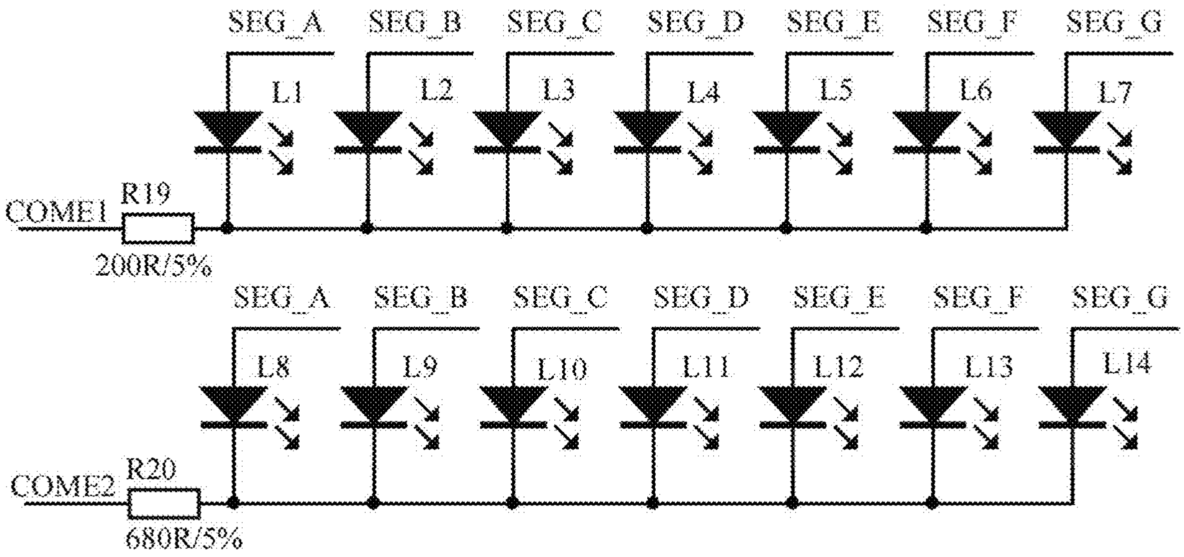
FIG. 9 is a circuit diagram of a display module according to an embodiment of the present disclosure.

By using a driving mode with two bidirectional thyristors, when one bidirectional thyristor is short circuited, the other bidirectional thyristor can work normally during a normal use cycle. The chip U1 can control the temperature of the PTC electric heating wire through this normal bidirectional thyristor. When the normal use cycle is exceeded, the chip U1 will report an error to prevent damage to the bidirectional thyristor, which may cause the circuit to become uncontrolled and the PTC electric heating wire to be burned out, and posing a safety hazard. Besides that, in the embodiment of the present disclosure, AC and DC are grounded together, and a voltage sampling is achieved through the third resistor R3 and the second R2. The chip U1 collects a voltage between two ends of the second resistor R2 through the AD-PTC pin, and a voltage between two ends of the PTC electric heating wire 11 can be obtained based on the voltage between two ends of the second resistor R2. From this, a resistance value of the PTC electric heating wire 11 can be calculated based on a relationship between voltage and resistance, and a current temperature value of the PTC electric heating wire 11 can be obtained. As shown in FIG. 9, the electric blanket further includes a display module 16, and the chip U1 displays the current temperature of the PTC electric heating wire 11 through the display module 16.

Figure 5:
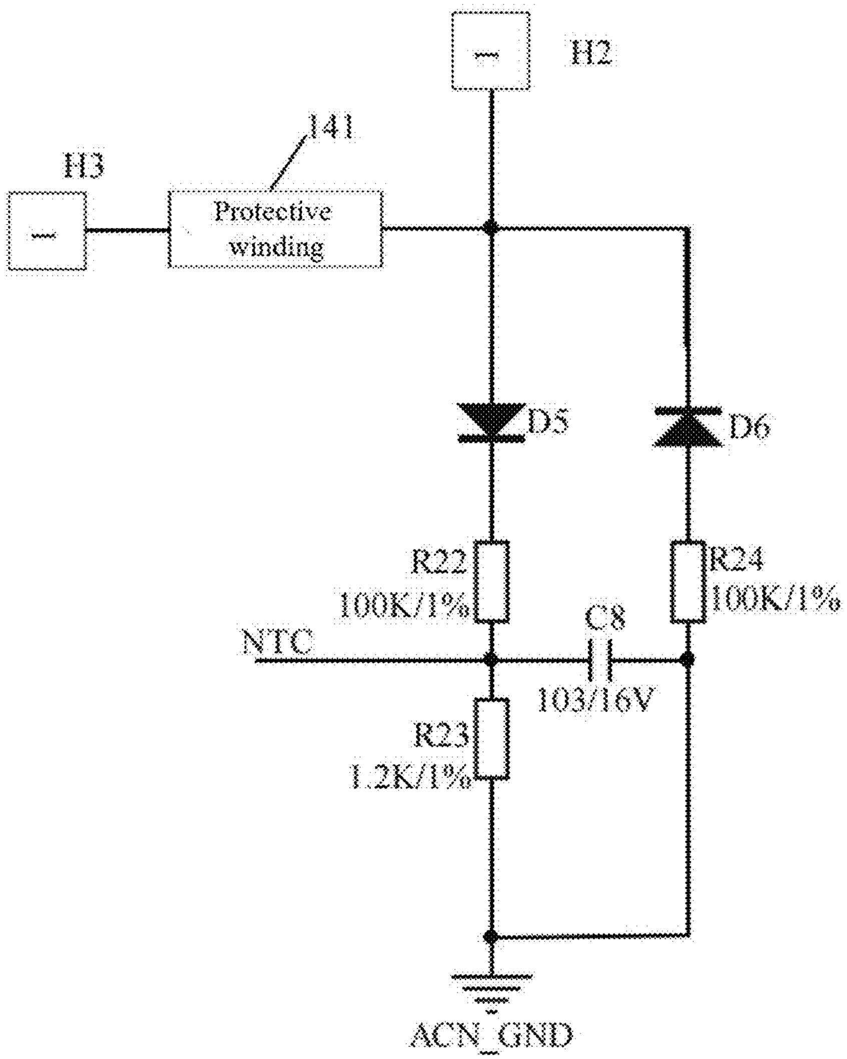
FIG. 5 is a circuit diagram of a burn-through detection module according to an embodiment of the present disclosure.

As shown in FIG. 5, the protection module 14 includes a protective winding 141 and a detection circuit. The PTC electric heating wire 11 includes a heating wire in a middle layer and a polyvinyl chloride layer that wraps the heating wire and having NTC (Negative Temperature Coefficient) thermistor characteristics. The protective winding 141 is wrapped around an outer surface of the polyvinyl chloride layer of the PTC electric heating wire 11, and the protective winding 141 may be made of copper, without temperature characteristics. A layer of polyvinyl chloride rubber is covered on an outside of the protective winding 40. The detection circuit includes a twenty-second resistor R22, a twenty-third resistor R23, a twenty-fourth resistor R24, an eighth capacitor C8, a fifth diode D5, and a sixth diode D6.

A positive pole of the fifth diode D5 and a negative pole of the sixth diode D6 are both connected to one end of the protective winding 141. A negative pole of the fifth diode D5 is connected to one end of the twenty-second resistor R22; a positive pole of the sixth diode D6 is connected to one end of the twenty-fourth resistor R24; the other end of the twenty-second resistor R22 is connected to one end of the twenty-third resistor R23; one end of the eighth capacitor C8 is connected to a NTC pin of the chip U1. The other end of the twenty-third resistor R23, the other end of the eighth capacitor C8, and the other end of the twenty-fourth resistor R24 are all grounded. The other end of the protective winding 40 is connected to the second pin of the first bidirectional thyristor T1.

When the PTC electric heating wire 11 is not heated, the polyvinyl chloride layer between the protective winding 141 and the heating wire in the PTC electric heating wire 11 is evenly distributed, and there is a coupling effect between the protective winding 141 and the heating wire, which generates a weak AC voltage. An AC voltage generated by this coupling effect is collected through a voltage collection network composed of the fifth diode D5, the twenty-second resistor R22, the eighth capacitor C8, and the twenty-third resistor R23. The fifth diode D5 is a rectifier diode that rectifies AC into DC, the twenty-second resistor R22 and the twenty-third resistor R23 form a voltage divider network; the eighth capacitor C8 is a filtering capacitor, and the voltage collection network collects an upper half of the AC voltage. The collected voltage is transmitted to the chip U1 through the NTC pin, the sixth diode D6 and the twenty-fourth resistor R24 are used to collect a lower half of the AC voltage. A circuit is formed so as to release the voltage of the NTC pin, in order to prevent the voltage of the NTC pin being abnormal, when the PTC electric heating wire 11 is energized to generate heat, the polyvinyl chloride layer will change its characteristics as the heating wire is heated up. The polyvinyl chloride layer gradually becomes softer, thereby resulting in a slight change in a distance between the protective winding wire 141 and the heating wire. In addition, a temperature effect of the polyvinyl chloride layer is superimposed, thus, a coupling voltage between the protective winding wire 141 and the heating wire is caused to become higher and higher, that is, the voltage of the NTC pin becomes higher and higher. When the temperature reaches a certain value or other abnormal reasons, a direct contact between the heating wire and the protective winding wire 141 occurs. When the voltage of the NTC pin exceeds a threshold, the chip U1 controls the first bidirectional thyristor T1 and the second bidirectional thyristor T2 to be disconnected, cut off the power supply, and generate an alarm error code to be sent to the display module 17 for display. Therefore, based on the voltage collected by the above voltage collection network, it can be detected that whether the heating wire is burned through. When the voltage of the NTC pin exceeds the threshold, it indicates that the heating wire has been burnt through, and the power supply is cut off at this time.

Figure 6:
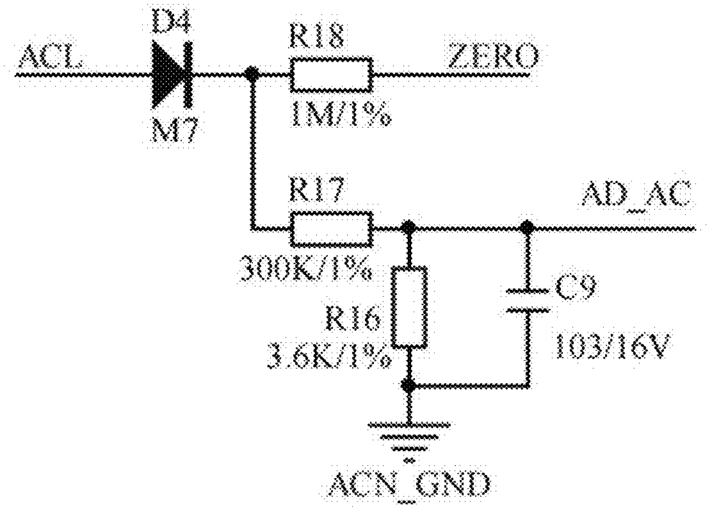
FIG. 6 is a circuit diagram of a zero-cross detection and voltage-reference module in an embodiment of the present disclosure.

As shown in FIG. 6, the electric blanket further includes a zero cross detection and voltage reference module 17, which includes a fourth diode D4, a sixteenth resistor R16, a seventeenth resistor R17, an eighteenth R18, and a ninth capacitor C9.

A positive pole of the fourth diode D4 is connected to the live wire AC1 of the AC power supply 20. A negative pole of the fourth diode D4 is connected to one end of the seventeenth resistor R17 and one end of the eighteenth R18; the other end of the eighteenth R18 is connected to a ZERO pin of the chip U1; the other end of the seventeenth resistor R17, one end of the sixteenth resistor R16, and one end of the ninth capacitor C9 are all connected to an AD-AC pin of the chip U1; the other end of the sixteenth resistor R16 and the other end of the ninth capacitor C9 are both grounded.

Through the fourth diode D4 and the eighteenth R18, the mains power is directly introduced into the chip U1 through the ZERO pin. Through a clamping circuit inside the chip U1, the voltage is controlled within a reasonable range and a zero point of the sine wave can be accurately determined, thereby achieving zero cross detection. In addition, through the sixteenth resistor R16, the seventeenth R17, and the ninth capacitor C9, the mains power can be converted into a weak voltage signal, which is then transmitted to the chip U1 through the AD_AC pin as an external reference power source, thereby enabling a reading of the voltage at any point of the current mains sine wave.

Figure 7:
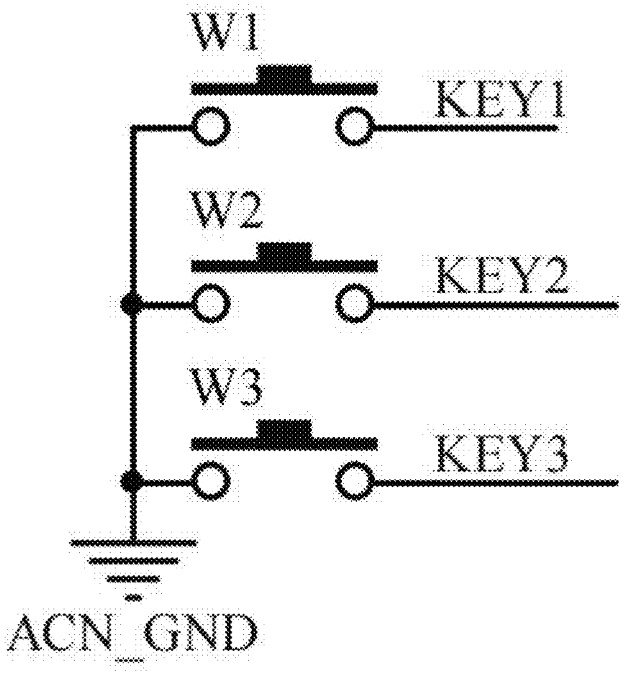
FIG. 7 is a circuit diagram of a button module according to an embodiment of the present disclosure.

As shown in FIG. 7, the electric blanket further includes a button module 18, which includes a power button W1, a heating button W2, and a timer button W3. When the timer button W3 is pressed, the control module 13 controls the switch module 12 to be disconnect after the timer time has elapsed.

In an implementation mode, one ends of the power button W1, the heating button W2, and the timing button W3 are all grounded; the other ends of the power button W1, the heating button W2, and the timing button W3 are respectively connected to a KEY1 pin, a KEY2 pin, and a KEY3 pin of the chip U1. When the power button W1 is activated, the chip U1 is powered on and initialized. When the heating button W2 is activated, the chip U1 starts to control the conduction of the first bidirectional thyristor T1 and the second bidirectional thyristor T2, so that the AC power supply 20 supplies power to the PTC electric heating wire 11, which performs heating work. The timing button W3 is configured to set a heating duration, which is also the timing time.

Figure 8:
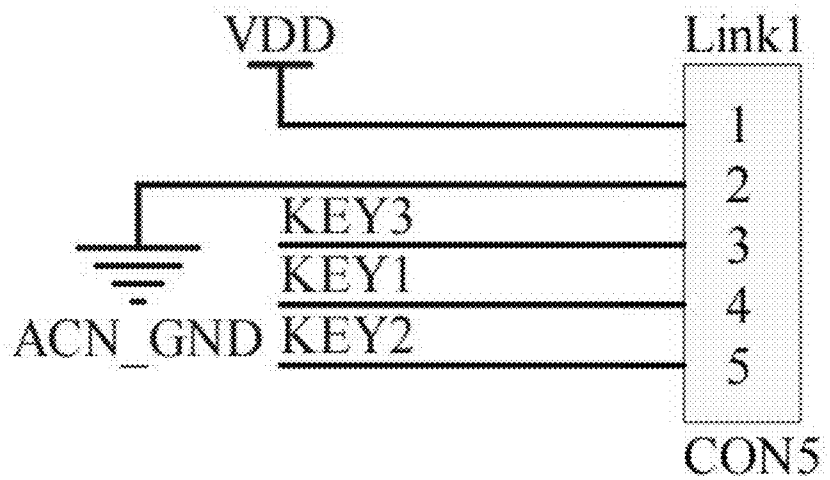
FIG. 8 is a circuit diagram of a program burning interface according to an embodiment of the present disclosure.

As shown in FIG. 8, the electric blanket further includes a program burning interface Link1. A first pin of the program burning interface Link1 is connected to the VDD pin of the chip U1, a second pin of the program burning interface Link1 is grounded: a third pin, a fourth pin, and a fifth pin of the program burning interface Link1 are respectively connected to the KEY1 pin, the KEY2 pin, and the KEY3 pin of the chip U1. Where, the program burning interface Link1 can serve as a backup interface for buttons. When the power button W1, the heating button W2, and the timing button W3 are damaged, external buttons can be connected through the program burning interface Link1 so as to achieve functions of the power button W1, the heating button W2, and the timing button W3.

As shown in FIG. 9, the display module 16 is configured to display the current temperature of the PTC electric heating wire 11. The display module 16 is implemented using a digital tube array composed of discrete lamp beads; a plastic part is placed on the lamp beads for light collection, which can effectively the reduce cost.

In an implementation mode, the display module 16 includes a nineteenth resistor R19, a twentieth resistor R20, and 14 light emitting diodes (LEDs), namely a first light emitting diodes L1, a second light emitting diode L2, a third light emitting diode L3, a fourth light emitting diode L4, a fifth light emitting diode L5, a sixth light emitting diode L6, a seventh light emitting diode L7, an eighth light emitting diode L8, a ninth light emitting diode L9, a tenth light emitting diode L10, an eleventh light emitting diode L11, a twelfth light emitting diode L12, a thirteenth light emitting diode L13 and a fourteenth light emitting diode L14. One end of the nineteenth resistor R19 is connected to a COME1 pin of the chip U1, the other end of the nineteenth resistor R19 is connected to negative poles of light emitting diodes L1 to L7. Positive poles of the light emitting diodes L1 to L7 are respectively connected to a SEG_A pin, a SEG_B pin, a SEG_C pin, a SEG_D pin, a SEG_E pin, a SEG_F pin, and a SEG_G pin of the chip U1. One end of the twentieth resistor R20 is connected to a COME2 pin of chip U1, the other end of the twentieth resistor R20 is connected to negative poles of the light emitting diodes L8 to L14. Positive poles of the light emitting diodes L8 to L14 are respectively connected to the SEG_A pin, the SEG_B pin, the SEG_C pin, the SEG_D pin, the SEG_E pin, the SEG_F pin, and the SEG_G pin of the chip U1.

To ensure a reliability of the circuit, an input terminal of the live AC1 of the AC power supply 20 is further connected to a fuse F1.

The working principle of the electric blanket of the present disclosure will be further introduced below.

When the electric blanket needs to generate heat, the power button W1 is firstly pressed, and the chip U1 is powered on and initialized, such as clock, RAM (Random Access Memory), watchdog timer, and various function initialization. After the initialization is successful, the chip U1 is entered a standby mode. When the heating button W2 is pressed, it is activated, and the chip U1 outputs a PWM control signal through the HEAT pin. The PWM control signal is divided into two paths, one path controls an intermittent conduction of the first bidirectional thyristor T1 through the sixth resistor R6, the sixth capacitor C6, the twenty-first resistor R21, and the seventh resistor R7, and the other path controls an intermittent conduction of the second bidirectional thyristor T2 through the fifth capacitor C5 and the fifth resistor R5. When both the first bidirectional thyristor T1 and the second bidirectional thyristor T2 are conductive, a path is formed in a branch where the PTC electric heating wire 11 is located. The PTC electric heating wire 11 obtains an operating voltage through the AC power supply 20 and generates heat during operation. A temperature control can be achieved by controlling a duty cycle of the PWM control signal. A larger duty cycle, a longer conduction time of the first bidirectional thyristor T1 and the second bidirectional thyristor T2, and a higher heat generated by the PTC electric heating wire 11, which results in a higher temperature. When the duty cycle is small, the conduction time of the first bidirectional thyristor T1 and the second bidirectional thyristor T2 is decreased, the heat generated is decreased, and the temperature is decreased, thereby achieving conduction control and temperature control. Where, the chip U1 can detect the temperature of the PTC electric heating wire 11 through the signal of AD_PTC pin. By obtaining the current temperature of the PTC electric heating wire 11, if the current temperature is higher than a preset range, a PWM control signal with a small duty cycle is outputted to reduce the heat of the PTC electric heating wire 11. If the current temperature is lower than the preset range, a PWM signal with a large duty cycle is outputted to increase the heat of the PTC electric heating wire 11, so as to maintain the current temperature within the preset range and maintain a constant temperature.

Where, the chip U1 can detect a working state (conduction or disconnection) of the first bidirectional thyristor T1 and the second bidirectional thyristor T2 through the signal of the AD_SCR pin, thereby achieving a monitoring of the first bidirectional thyristor T1 and the second bidirectional thyristor T2.

This specification uses specific examples to explain the principles and implementation modes of the present disclosure. The above embodiments are only used to help understand the method and core idea of the present disclosure; and for those skilled in the art, there may be changes in the specific implementation and application scope based on the idea of the present disclosure. In summary, the content of this specification should not be understood as limiting the present disclosure.

What is claimed is:

1. An electric blanket, comprising:
- a PTC electric heating wire, which is connected to an AC power source and generates heat when the PTC electric heating wire is powered on;
- a switch module, which is connected to the PTC electric heating wire and correspondingly causes the PTC electric heating wire to be powered on or off when it is conducted on or off;
- a control module, which is connected to the switch module and capable of controlling conduction or disconnection of the switch module;
- a protection module, which is connected to the control module;
- wherein the control module is configured to:
- obtain voltage signal at two ends of the PTC electric heating wire through the switch module, convert the voltage signal so as to obtain a resistance value of the PTC electric heating wire, obtain a current temperature value of the PTC electric heating wire based on the resistance value of the PTC electric heating wire,
- control the current temperature value of the PTC electric heating wire within a preset range through the switch module, and
- control the PTC electric heating wire to be powered off through the switch module when the PTC electric heating wire is detected to be burnt through by the protection module;
- wherein the switch module comprises a first bidirectional thyristor T1, a second bidirectional thyristor T2, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12, a twenty-first resistor R21, a fourth capacitor C4, a fifth capacitor C5, a sixth capacitor C6, a seventh capacitor C7, a tenth capacitor C10, a seventh diode D7, an eighth diode D8, and a voltage regulator D9;
- wherein the control module comprises a chip U1;
- wherein the protection module comprises a protective winding and a detection circuit.

2. The electric blanket according to claim 1, further comprising a power conversion module, the power conversion module is connected to the AC power source for converting AC power into a working voltage required by the control module,
- wherein the power conversion module comprises a voltage dependent resistor VR, a first capacitor CX1, a first electrolytic capacitor C1, a second electrolytic capacitor C2, a first resistor R1, a fourteenth resistor R14, a fifteenth resistor R15, a thirteenth resistor R13, a second diode D2, a third diode D3, and a chip IC1;
- one end of the voltage dependent resistor VR, one end of the first capacitor CX1, one end of the fourteenth resistor R14, and one end of the first resistor R1 are all connected to a live wire of the AC power supply;
- another end of the fourteenth resistor R14, one end of the fifteenth resistor R15, another end of the voltage dependent resistor VR, another end of the first capacitor CX1, and another end of the fifteenth resistor R15 are all grounded;
- another end of the first resistor R1 is connected to a positive pole of the third diode D3, a negative pole of the third diode D3 is connected to a positive pole of the second diode D2;

a negative pole of the second diode D2 is connected to four Drain pins of the chip IC1;

a VOUT pin of the chip IC1 is connected to a positive pole of the second electrolytic capacitor C2;

the control module is connected to the VOUT pin of the chip IC1, a SEL pin of the chip IC1 is grounded by the thirteenth resistor R13, a VDD pin of the chip IC1 is connected to a positive pole of the first electrolytic capacitor C1, a negative pole of the first electrolytic capacitor C1 and a negative pole of the second electrolytic capacitor C2 are both grounded, a GND pin of the chip IC1 is grounded.

3. The electric blanket according to claim 2, wherein the chip U1 is implemented by a microcontroller, a VDD pin of the chip U1 is connected to the VOUT pin of the chip IC1.

4. The electric blanket according to claim 3, wherein a first pin of the first bidirectional thyristor T1 is connected to a second pin of the second bidirectional thyristor T2, a second pin of the first bidirectional thyristor T1 is connected to one end of the PTC electric heating wire, another end of the PTC electric heating wire is connected to the live wire of the AC power supply, a third pin of the first bidirectional thyristor T1 is connected to a negative pole of the voltage regulator D9 sequentially through the seventh resistor R7, the twenty-first resistor R21, and the sixth capacitor C6, a positive pole of the voltage regulator D9 is grounded, a first pin of the second bidirectional thyristor T2 is grounded through the second resistor R2, a third pin of the second bidirectional thyristor T2 is connected to a HEAT pin of the chip U1 sequentially through the fifth resistor R5 and the fifth capacitor C5;

one end of the third resistor R3 and one end of the fourth resistor R4 are both connected to the first pin of the second bidirectional thyristor T2;

another end of the third resistor R3, one end of the fourth capacitor C4, and a negative pole of the eighth diode D8 are all connected to an AD_PTC pin of the chip U1;

another end of the fourth capacitor C4 and a positive pole of the eighth diode D8 are both grounded;

the sixth resistor R6 is connected between the negative pole of the voltage regulator D9 and the HEAT pin of the chip U1;

one end of the eighth resistor R8 and one end of the seventh capacitor C7 are both connected to an AD_SCR pin of the chip U1, and another end of the seventh capacitor C7 is grounded, another end of the eighth resistor R8 is connected to one end of the ninth resistor R9, one end of the tenth resistor R10, and the first pin of the first bidirectional thyristor T1, another end of the ninth resistor R9 is connected to the third pin of the first bidirectional thyristor T1; another end of the tenth resistor R10 is connected to one end of the eleventh resistor R11, one end of the twelfth resistor R12, and one end of the tenth capacitor C10, another end of the eleventh resistor R11 is connected to a negative pole of the seventh diode D7, another end of the twelfth resistor R12 and another end of the tenth capacitor C10 are both grounded;

a positive pole of the seventh diode D7 is connected to the second pin of the first bidirectional thyristor T1.

5. The electric blanket according to claim 4, wherein the PTC electric heating wire comprises a heating wire and a polyvinyl chloride layer that wraps the heating wire and having NTC characteristics, wherein the protective winding is wound on an outer surface of the polyvinyl chloride layer, so that there is a coupling effect between the protective winding and the heating wire, and the detection circuit comprises a twenty-second resistor R22, a twenty-third resistor R23, a twenty-fourth resistor R24, an eighth capacitor C8, a fifth diode D5, and a sixth diode D6;

a positive pole of the fifth diode D5 and a negative pole of the sixth diode D6 are both connected to one end of the protective winding;

a negative pole of the fifth diode D5 is connected to one end of the twenty-second resistor R22, a positive pole of the sixth diode D6 is connected to one end of the twenty-fourth resistor R24;

another end of the twenty-second resistor R22, one end of the twenty-third resistor R23, and one end of the eighth capacitor C8 are all connected to a NTC pin of the chip U1, another end of the twenty-third resistor R23, another end of the eighth capacitor C8 and another end of the twenty-fourth resistor R24 are all grounded;

another end of the protective winding is connected to the second pin of the first bidirectional thyristor T1;

the chip U1 obtains a voltage generated by the coupling effect between the protective winding and the heating wire through the NTC pin and detects whether the PTC electric heating wire is burnt through via the voltage generated by the coupling effect.

6. The electric blanket according to claim 3, further comprising a zero-cross detection and voltage-reference module, wherein the zero-cross detection and the voltage reference module comprises a fourth diode D4, a sixteenth resistor R16, a seventeenth resistor R17, an eighteenth R18, and a ninth capacitor C9;

a positive pole of the fourth diode D4 is connected to the live wire of the AC power supply, a negative pole of the fourth diode D4 is connected to one end of the seventeenth resistor R17 and one end of the eighteenth R18, another end of the eighteenth R18 is connected to a ZERO pin of the chip U1, another end of the seventeenth resistor R17, one end of the sixteenth resistor R16 and one end of the ninth capacitor C9 are all connected to an AD-AC pin of the chip U1, another end of the sixteenth resistor R16 and another end of the ninth capacitor C9 are both grounded.

7. The electric blanket according to claim 3, further comprising a button module, wherein the button module comprises a power button, a heating button, and a timing button;

when the timing button is pressed, the control module controls the switch module to be disconnected after a timing time has elapsed.

8. The electric blanket according to claim 7, wherein one end of the power button, one end of the heating button, and one end of the timing button are grounded, another end of the power button, another end of the heating button, and another end of the timing button are respectively connected to a KEY1 pin, a KEY2 pin, and a KEY3 pin of the chip U1.

9. The electric blanket according to claim 8, further comprising a program burning interface, wherein a first pin of the program burning interface is connected to the VDD pin of the chip U1;

a second pin of the program burning interface is grounded, a third pin, a fourth pin, and a fifth pin of the program burning interface are respectively connected to the KEY3 pin, the KEY1 pin, and the KEY2 pin of the chip U1.

10. The electric blanket according to claim 3, further comprising a display module, wherein the display module comprises a nineteenth resistor R19, a twentieth resistor R20, and 14 light emitting diodes, wherein the 14 light emitting diodes are respectively a first light emitting diodes L1, a second light emitting diode L2, a third light emitting diode L3, a fourth light emitting diode LA, a fifth light emitting diode L5, a sixth light emitting diode L6, a seventh light emitting diode L7, an eighth light emitting diode L8, a ninth light emitting diode L9, a tenth light emitting diode L10, an eleventh light emitting diode L11, a twelfth light emitting diode L12, a thirteenth light emitting diode L13 and a fourteenth light emitting diode L14;

one end of the nineteenth resistor R19 is connected to a COME1 pin of the chip U1, another end of the nineteenth resistor R19 is connected to negative poles of the light emitting diodes L1 to L7, positive poles of the light emitting diodes L1 to L7 are respectively connected to a SEG_A pin, a SEG_B pin, a SEG_C pin, a SEG_D pin, a SEG_E pin, a SEG_F pin, and a SEG_G pin of the chip U1;

one end of the twentieth resistor R20 is connected to a COME2 pin of the chip U1, another end of the twentieth resistor R20 is connected to negative poles of the light emitting diodes L8 to L14;

positive poles of the light emitting diodes L8 to L14 are respectively connected to the SEG_A pin, the SEG_B pin, the SEG_C pin, the SEG_D pin, the SEG_E pin, the SEG_F pin, and the SEG_G pin of the chip U1.

* * * * *